Dec. 3, 1968     D. LEJEUNE     3,413,799
METALLIC CABLE
Filed Sept. 1, 1967
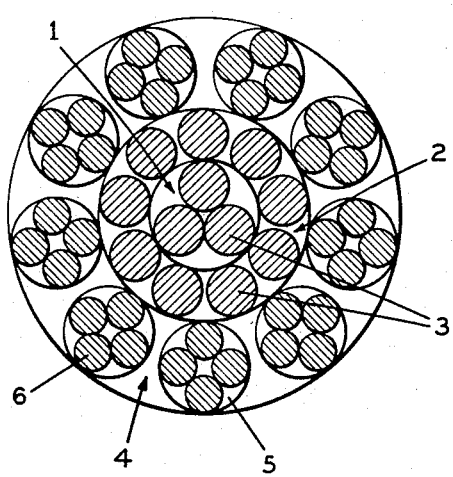
INVENTOR
DANIEL LEJEUNE
BY
HIS ATTORNEYS 3,413,799
METALLIC CABLE
Daniel Lejeune, Clermont-Ferrand, France, assignor to Compagnie Generale des Etablissements Michelin raison sociale Michelin & Cie, Clermont-Ferrand, France
Filed Sept. 1, 1967, Ser. No. 664,995
Claims priority, application France, Sept. 7, 1966, 75,621
8 Claims. (Cl. 57—145)

ABSTRACT OF THE DISCLOSURE

Metallic cords or cables for reinforcing tires, conveyor belts, sheathed tubing and the like in which the core wires are of larger diameter than the sheath wires in a ratio between about 1.05/1 and 2/1 in order to improve and render more uniform the resistance of the wires in the cord to breakage by repeated bending and to enhance the resistance of the cord to compressive stresses.

The present invention relates to improvements in metallic cords or cables, especially cords used for reinforcing rubber and other elastomeric articles, such as tires, conveyor belts, sheathed, and the like.

Metallic cords are commonly used in the carcass and the crown or tread zones of tires. Typical cords have a center core of one or more layers of wires and a peripheral cover composed of one or more layers of wires or strands containing a plurality of wires. In practice, the various elements of the cords, i.e., the core and the peripheral sheath, consist of individual wires which all have the same diameter, such diameter varying, depending on the use of the cords, from rarely less than 0.09 mm. to rarely more than 0.45 mm.

By subjecting this kind of cord to fatigue tests, I have found recently that the core has a fatigue resistance much higher than that of the peripheral cover. Furthermore, when the cord was subjected to a large number of repeated bendings, it was damaged progressively due to the breaking of the outer wires before the inner ones broke.

The present invention takes advantage of the observation to differentiate the wires forming the core from the wires forming the peripheral cover so as to balance the resistance to fatigue of the various parts of the cord without imparting to either one a resistance which is unnecessarily high or dangerously low and thereby provides cords having enhanced resistance to axial compression without decrease in fatigue resistance.

The metallic cords in accordance with the invention comprise a core and a peripheral sheath, both consisting of wires of various diameters distributed in one or more layers of strands or wires, and in which the diameter of the wires is smaller in the peripheral sheath than in the core, the ratio of the greatest diameter to the smallest diameter ranging from 1.05/1 to 2/1 and preferably 1.25/1 to 1.50/1.

More particularly, the diameter of the individual wires in the core of the cord is greater than normal and as a result of the increased diameter, the wires in the core have a decreased resistance to fatigue but the decrease is compensated for by their more favorable position in the core. With larger diameter core wires, the total number of wires in the core can be decreased in the event a constant total cross-section of the metal is to be maintained or if the cross-section of the cord is not to be increased in the ratio of the increase of the diameter of the wires making up the core.

The increase of the diameter of the wires in the core has the important effect of stiffening the core of the cord and it was found that by stiffening the core of a cord, its resistance to axial compression is increased, which is of advantage in cords used in tires which are subjected to both tension and compression.

Finally, using heavier wires, in smaller numbers, leads to reduction of manufacturing costs for the reason that heavier or thicker wires are less difficult to draw than fine wires, and the reduction in the number of wires to be assembled into a cord enables a reduction of the number of machines or elements of machines operating to produce the cords.

The increase of the diameter of the wires forming the core of the cord in relation to the diameter of the wires forming the peripheral layer or layers should be kept below a certain maximum. Experience has shown that at a diameter ratio ranging about 1.25/1 or 1.30/1 fatigue resistance becomes balanced in the core and in the sheath of the cord. Beyond this value, the core of a cord subjected to a large number of bending cycles shows a higher percentage of breaks, and the difference becomes more accentuated as the diameter ratio increases so that it becomes less advantageous as such ratio passes beyond 1.5/1.

In accordance with the invention, substantial advantages are obtained by controlling two additional structural characteristics of the metallic cord. Firstly, clearance between adjacent wires and/or strands, especially in the core, should be kept at a minimum, and the wires and strands of the cord elements should be selected to assure intimate contact between them. The reduction in the proportion of empty space in the core contributes to stiffening of such core. Secondly, in certain fields of use, the core of the cord or the center of the core preferably consists of a multifilament element (strand) and not a monofilament element (single wire), in order to prevent axial sliding of the center core element of the cord in relation to an adjacent layer.

For a better understanding of the invention, reference may be had to the accompanying drawing, in which the single figure is a view in cross-section of a typical cord embodying the invention.

The metallic cord selected for purposes of illustration is formed of two layers 1 and 2 consisting respectively, of three wires 3 twisted together and nine wires 3 twisted around the layer 1, each wire 3 having a diameter of 23/100 mm. The cord includes a peripheral layer 4 formed of nine strands 5, each having four wires 6 measuring 18/100 mm. in diameter. The ratio of the diameter of the heavier wires 3 to the diameter of the finer wires 6 is approximately 1.28/1.

Fatigue resistance tests of such a cord have shown that statistically, there was a substantially equal percentage of breakings of wire 6 and wires 3, although the finer wires 6 are clearly more flexible than the latter when the two sizes of wires are manufactured from the same metal.

The cord described corresponds to the formula (I) $(3+9)_{23}+(9+4)_{18}$.

Other formulas for cords in accordance with the invention are, for example:

(II) $(3+9)_{23}+18_{18}$ (III) $(3+9)_{26}+8\times(1+6)_{23}$ (IV) $(3+9)_{26}+20_{18}$ (V) $3_{26}+10_{23}+20_{18}$ In these formulas, the sign + indicates the arrangement of the layers and the number of wires in the layers starting with the layer which is closest to the center. The sign × indicates strands which may have several layers, such as, for example, in the second formula the sheath has eight strands composed of a center wire and a layer or sheath of six wires. The figures in parentheses indicate the number of wires in a layer and the diameter of the wires in the hundredths of millimeters is indicated by the index, e.g., 26, 23, 18.

Other arrangements of the wires and strands in the cords are possible within the scope of the invention and wires can be used having diameters other than those most commonly used, e.g., within a range of 0.05 to 0.50 of a millimeter. Also, the invention may be applied to hooped cords, i.e., cords having a wire or strand arranged in a spiral around the cord in order to prevent spreading of the cord in case of strong pressure.

Accordingly, it will be understood that the embodiments of the invention described above are illustrative and the invention is limited only as defined in the following claims.

I claim:

1. A metallic cord for reinforcing elastomeric articles comprising at least one layer of core wires and at least one layer of peripheral sheath wires, the diameter of the wires of said sheath layer being smaller than the diameter of the core wires, the ratio of the larger diameter wires to the smaller diameter wires being between about 1.05/1 to 2/1.

2. The metallic cord set forth in claim 1 in which the ratio of the larger diameter wires to the smaller diameter wires is between about 1.25/1 to 1.50/1.

3. The metallic cord as set forth in claim 1 in which the said core wires are in contact with one another with negligible clearance therebetween.

4. The metallic cord set forth in claim 1 in which the core comprises a multiple wire strand.

5. A reinforced elastomeric product comprising at least one reinforcement of metallic cords as set forth in claim 1.

6. A reinforced elastomeric product comprising at least one reinforcement of metallic cords as set forth in claim 2.

7. A reinforced elastomeric product comprising at least one reinforcement of metallic cords as set forth in claim 3.

8. A reinforced elastomeric product comprising at least one reinforcement of metallic cords as set forth in claim 4.

References Cited

UNITED STATES PATENTS

| | | | |
|---|---|---|---|
| 1,759,410 | 4/1930 | Marston | 152—357 XR |
| 1,919,509 | 7/1933 | Grobl | 57—145 |
| 2,075,777 | 3/1937 | Brownell | 57—139 |
| 2,116,937 | 5/1938 | Vecsey | 152—359 |
| 2,359,090 | 9/1944 | Dyer | 57—145 XR |
| 2,492,352 | 12/1949 | Bourbon | 57—145 |
| 2,792,868 | 5/1957 | Benson | 57—148 XR |
| 3,336,744 | 8/1967 | Peene | 57—145 |

FOREIGN PATENTS 1,264,878   5/1961   France.

FRANK J. COHEN, *Primary Examiner.*

DONALD E. WATKINS, *Assistant Examiner.*